United States Patent [19]

Veen et al.

[11] Patent Number: 5,404,989
[45] Date of Patent: Apr. 11, 1995

[54] METHOD FOR DISTRIBUTING GOODS AND A SORTING INSTALLATION FOR PRACTICING THIS METHOD

[75] Inventors: Catharina A. Veen, Bentveld; Ernestus J. M. van Hattum, Delft, both of Netherlands

[73] Assignee: Promech Sorting Systems B.V., Netherlands

[21] Appl. No.: 83,066

[22] Filed: Jun. 25, 1993

[51] Int. Cl.⁶ ............................................. B65G 47/46
[52] U.S. Cl. ............................... 198/365; 198/465.4; 198/486.1; 198/477.1
[58] Field of Search ............ 198/365, 370, 465.4, 198/477.1, 486.1, 680, 637; 209/937

[56] References Cited

U.S. PATENT DOCUMENTS

| | | | |
|---|---|---|---|
| 1,247,535 | 11/1917 | Huddleston | 209/937 X |
| 4,174,773 | 11/1979 | Venzke | 198/365 |
| 4,358,009 | 11/1982 | Rysti | 198/365 |
| 4,473,011 | 9/1984 | Wuschek | 198/465.4 X |
| 4,909,373 | 3/1990 | Geerts | 198/365 |
| 5,190,135 | 3/1993 | Solund | 198/365 |
| 5,311,976 | 5/1994 | Backman | 198/365 X |

FOREIGN PATENT DOCUMENTS 0372906  6/1990  European Pat. Off. ............ 209/937

*Primary Examiner*—D. Glenn Dayoan
*Attorney, Agent, or Firm*—Lalos & Keegan

[57] ABSTRACT

A method for sorting goods, suspended on garment hangers, each of which is carried by a travelling releasable carrying member, circulating along a path having a series of ejection stations. Subsequent carrying members are provided with a lever capable of engagement by a tiltable trigger plate located at an ejection station for opening the carrying member and ejecting the concerning hanger and clothing. The levers are alternatively mounted at the right and at the left side of subsequent claws. Each station includes a trigger plate at the left and right side of the passing carrying members.

4 Claims, 3 Drawing Sheets

METHOD FOR DISTRIBUTING GOODS AND A SORTING INSTALLATION FOR PRACTICING THIS METHOD

BACKGROUND OF THE INVENTION

This invention relates to a method and an installation for sorting goods, such as articles of clothing, which are each carried for instance by a garment hanger, supported by carrying members attached to a driven continuous conveyor, such as a cable or chain, traversing a closed track along which a number of ejection stations are installed. In each carrying member, which is releasable, a garment hanger can be taken up. These members are attached at regular intervals to said conveyor and each member is constructed with actuating means such as an operating lever for opening the releasable carrying member. For this purpose each ejection station is provided with a control member, for example a tiltable trigger plate, with which the actuating lever of a passing carrying member cooperates for opening said member and releasing the concerning hanger with the goods.

A known sorting installation of this type has a capacity which is directly related to two factors: the speed of the conveyor on the one hand and the mutual spacing between the ejection stations on the other hand. However, it is not possible to increase the capacity of the sorting installation by simply allowing the speed of travel of the conveyor to increase since the goods, especially clothing are subject to the influence of air resistance and an increase in the speed causes the suspended goods to assume a sloping position. Moreover, the mutual spacing of the ejection stations cannot be reduced to below a certain minimum since otherwise an unimpeded operation of the control member by a passing carrying member is no longer guaranteed.

OBJECT OF THE INVENTION

The aim of the invention is to provide an method, with which an increase in the sorting capacity is nevertheless achievable without an increase in the transport speed.

SUMMARY OF THE INVENTION

The invention proposes to direct the actuating means of successive carrying members alternately to the left and to the right side of the conveyor thereby providing each ejection station with two control members which are located opposite to one another and which are both energizable independently, between which control members the conveyor with the carrying members is travelling. Due to the alternative left and right position of the actuating means in subsequent carrying members, it is possible to halve the distance (or pitch) of said members on the conveyor without risk of interference between the control members of a station and the actuating means of passing carrying members.

As a result, both the mutual spacing of the carrying members and the distance between successive ejection stations can be reduced without a risk of hindrance during sorting. By energizing the control members in one and the same ejection station a number of times, one obtains a substantial increase in the number of goods sorted-out per time unit in comparison with the conventional system in which the actuating means are all positioned at the same side of the carrying members. The speed of travel of the conveyor is in both cases the same.

In this connection it is also pointed out that it is not possible to provide each carrying member with both a left and a right actuating means because a greater mutual distance between successive ejection stations is then necessary to prevent hindrance in the functioning of the control members.

Known in the art is BUNTEN 3,151,730 dealing with a conveyor system for transporting a series of garment hangers supported by load carriers provided with actuating rollers on both sides. These carriers pass through ejection stations, comprising tiltable control members which can be energized in order to displace the actuating rollers, such that the garment hanger is sliding in side ward direction, either to the left or to the right so as to arrive in a lateral waiting position within a J-shaped lug. Hereafter the hanger is stripped off its lug by a projecting arm. BUNTEN does not suggest to provide the load carriers with an actuating member only on one side, alternatively to the left and to the right, and is consequently not capable to reduce the spacing of adjacent load carriers in order to increase the unloading capacity of the system, without raising the speed of the conveyor.

The invention will be explained in more detail with reference to the drawing.

DESCRIPTION OF THE DRAWING

FIG. 2 is a greatly enlarged view of FIG. 1 with two ejection stations, showing a still further enlarged portion of the conveyor in FIG. 2a.

DESCRIPTION OF A PREFERRED EMBODIMENT

Figure 1:
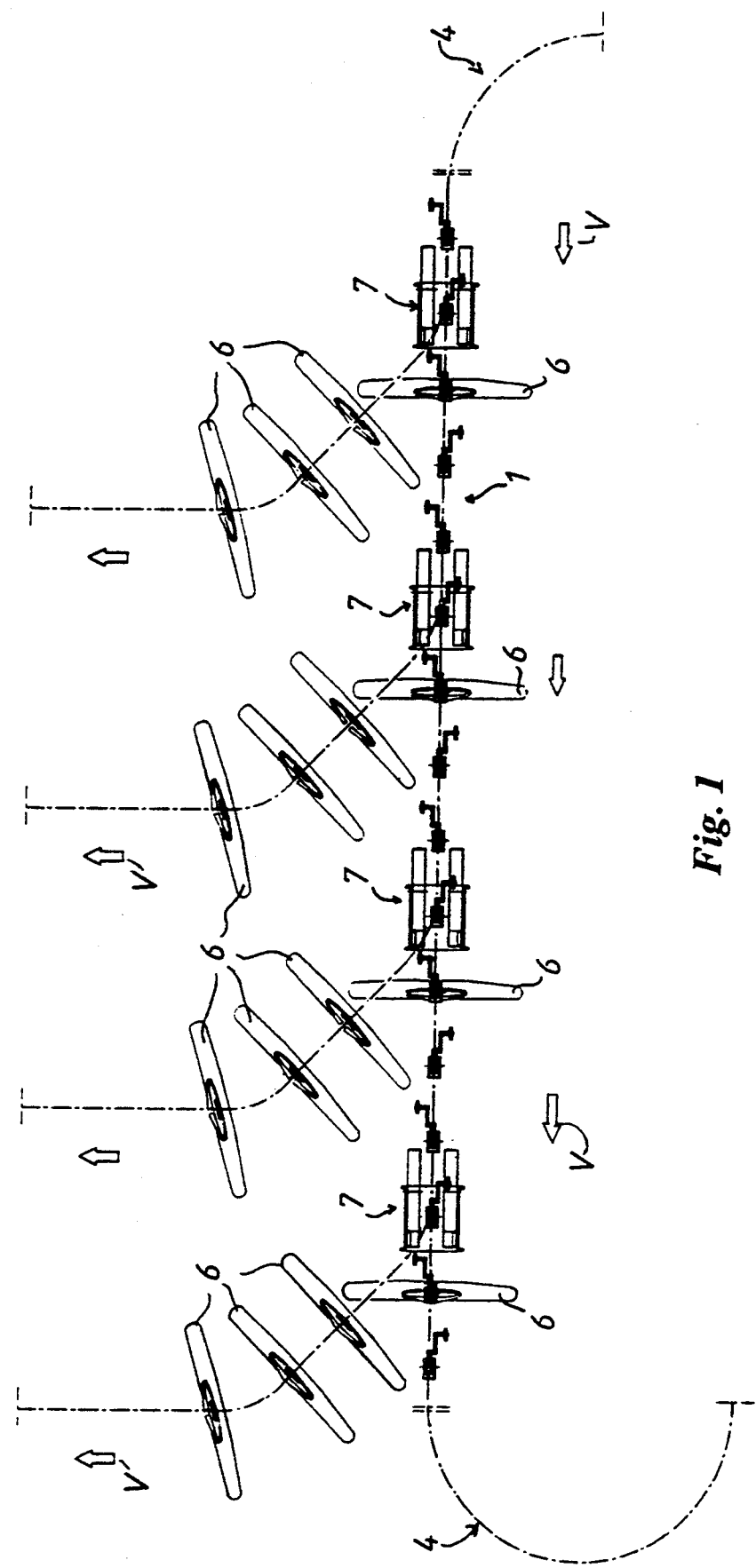
FIG. 1 is a schematic plan view of a portion of a sorting installation provided with a number of ejection stations.
Figure 2:
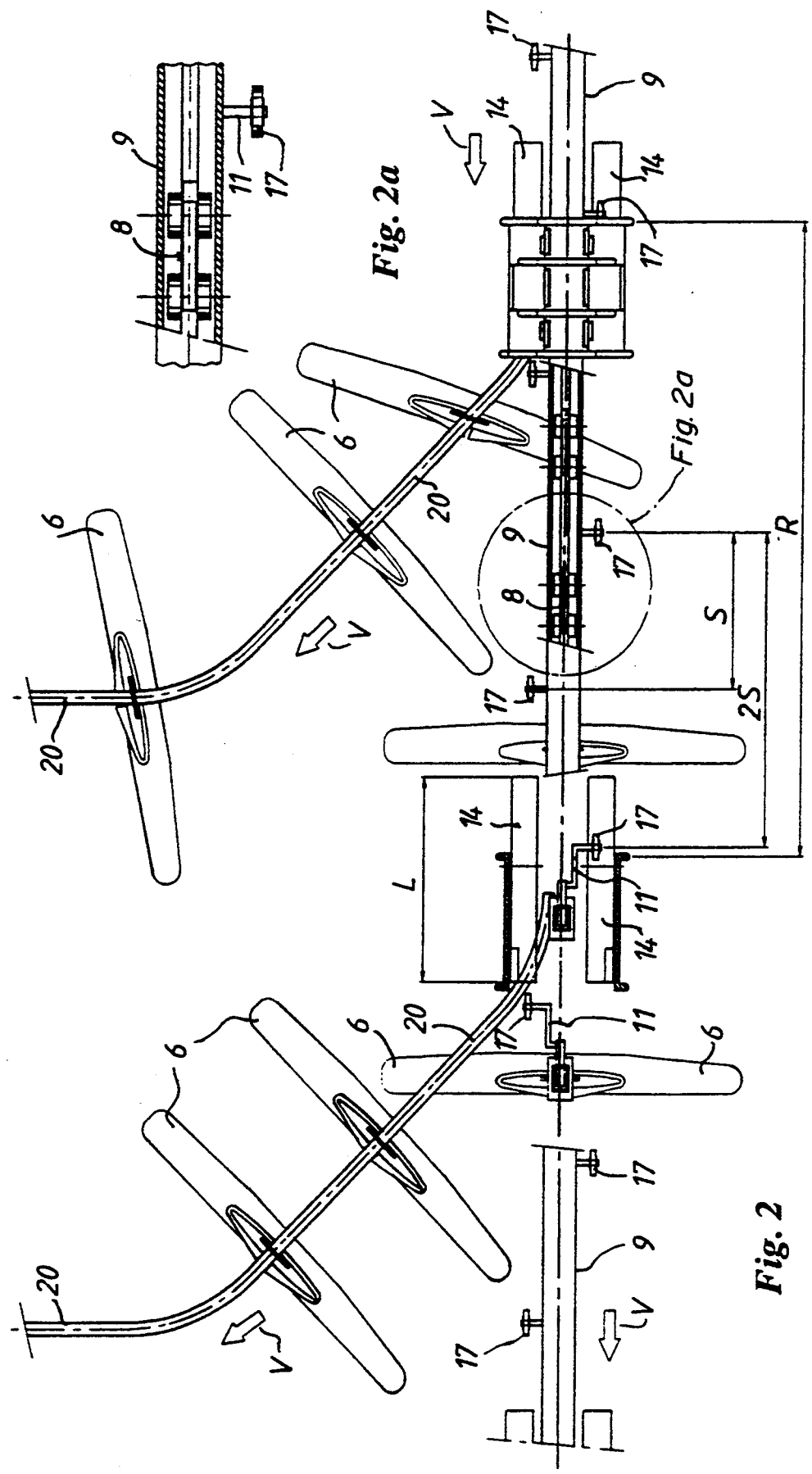
Figure 3:
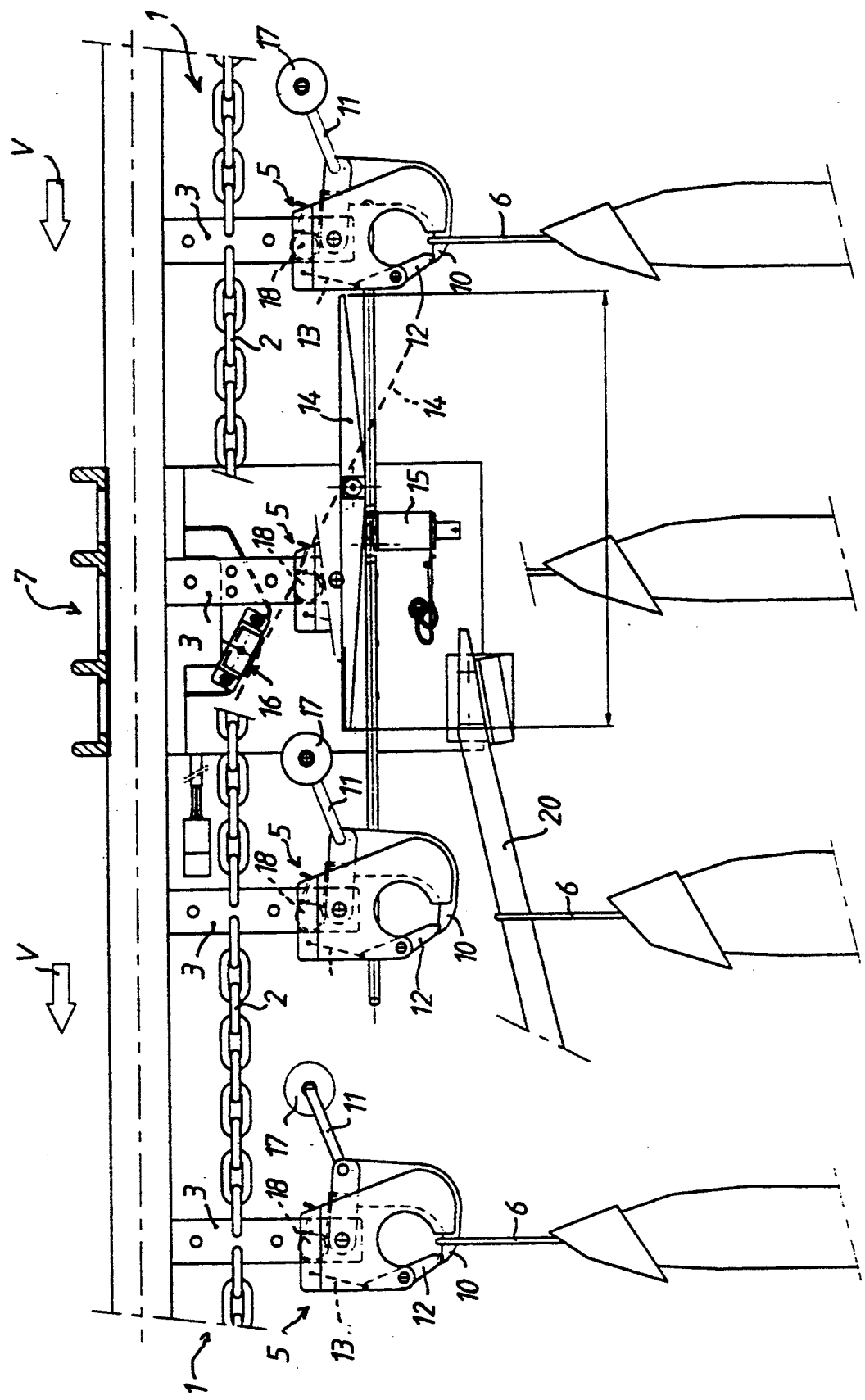
FIG. 3 is a side view of an ejection station with some parts broken away.

The sorting installation, of which the most important parts can be seen in FIGS. 2 and 3, is made up of a horizontal conveyor 1 which, in a manner known per se, consists of conveyor elements 2 such as a cable or chain interconnected by vertical strips 3 and provided with a drive (not shown). The continuous conveyor 1 traverses a closed track 19 employing two semi-circular curves 4 partly shown in FIG. 1. The conveyor 1 is provided at regular intervals with releasable carrier members or claws 5 which can be actuated and in which a suspension member, for instance a hook-shaped hanger 6 (for example of the garment hanger type) can be taken up. These garment hangers have a position perpendicular to the direction of travel indicated by an arrow V. Along the said track of the conveyor 1 there are a number of ejection stations 7 which can be actuated by the passing articles or hangers to open the relevant claw and eject the hanger with the garment. Each station 7 is related to the destination of the goods, collected on a fixed discharge rail 20 on one side of the track 19.

The discharge or ejection of a suspension member 6 with an article is effected by providing each hanger or article with a code, while a reader for this code is installed in each ejection station 7. These features are known in the art, and are e.g. described in U.S. Pat. No. 3,842,744 granted to Willem LEYZERS VIS. A computer comprising an appropriate program gives a correct magnetic code to every article entering the system after having received instructions from an operator feeding the articles to the sorting installation. This code is determining at which station 7 the article (with its hanger) will be ejected for further delivery. The passing of the magnetic code along the reader of the concerning station 7 energizes this station as will hereafter be described.

Each claw 5 is suspended from a trolley 8 which is guided in a tube profile 9, which is in the form of a reverse U and is provided with a slot in the lower wall to allow the passage of the strip 3 between the trolley 8 and the claw 5. The conveyor element (the chain 2) is connected to this vertical strip 3. Each claw is provided with a bottommost hook 10 which can be turned away with the aid of an actuating lever 11. The access to the claw 5 is closed by a lip 12 which can pivot inwards against the force of a spring 13. A tiltable control member or trigger plate 14, which is horizontal in the rest position (see FIG. 3), is located in each ejection station 7. When the reader in the ejection station 7 receives a signal that a hanger or article carried in an approaching claw 5 has to be sorted out, a pneumatic ram 15 comes into operation, so that the trigger plate 14 is pushed into the sloping position indicated by a broken line in FIG. 3. The plate 14 is held in this position by a holding magnet 16. A roller 17 on the end of the actuating lever 11 normally hovers over the horizontal trigger plate 14.

When the claw 5, from which the article must be ejected, enters the station 7, the ram 15 will be energized, bringing the plate 14 in its inclined position. The roller 17 of the actuating lever 11 comes into contact with the plate 14, which is kept in his inclined position by the magnet 16. As a consequence, the actuating lever 11 is tilted and in this way turns the lowermost hook 10 of the claw 5. The claw is opened and the hanger 6 with the article, is ejected as a result of gravity. The tilting of the lever 11 is restricted, so that during the further movement of the claw 5, the roller 17 will pull the plate 14 away from the holding magnet 16. As a result, the plate 14 falls back into its horizontal position. The claw 5 also closes because the lowermost hook 10 is moved back by a torsion spring 18 into its closed position.

The present sorting installation differs in that the actuating levers 11 are not always (as is customary) fitted on the same side of the claws 5, but that these levers are positioned alternately to the left and to the right side of the track for successive claws 5 (see FIGS. 2 and 3). This also means that each ejection station 7 is provided with two trigger plates 14 which are located opposite one another and can be engaged independently and between which the conveyor 1 with the claws 5 moves. The magnetic code given by the operator through the computer to the concerning article, will at the same time take into consideration the position of the actuating lever 11 either at the left or at the right of the claw 5. Consequently the correct plate 14 will be pushed by its pneumatic ram 15, leaving the opposite plate 14 in its horizontal rest position.

This alternate positioning of the actuating levers 11 on the left and on the right side of successive claws has the advantage that both the mutual spacing of successive claws 5 in the conveyor 1 and the mutual distance between successive ejection stations 7 can be made smaller than was possible hitherto. This limitation in the conventional sorting installation is caused by the necessary length L of each tiltable trigger plate 14. As a consequence of the alternate positioning of the actuating levers 11, the spacing between two successive claws 5, and also the mutual spacing of the ejection stations 7, can be made smaller without there being a risk of undesired contact between a roller 17 and a plate 14. This renders it possible to obtain a more compact arrangement and thus a greater capacity within a given space and with the same conveyor speed.

We claim:

1. A method for distributing separate products, each carried by a suspension member, each of said suspension members being individually supported by a carrying member comprising actuating means for releasing the suspension member, said carrying members travelling along a common mainly horizontal track, said common track being provided with mutually spaced ejection stations, each station being provided with an energizeable control member capable of engaging the actuating member of the carrying member, the method comprising providing an actuating member on only one side of each said carrying member, said one side alternating to the right and to the left on subsequent carrying members, energizing said control member within each ejection station prior to passing a carrying member through said station, displacing an actuating member of said passing carrying member, throwing off a passing suspension member with a product carried thereon during its movement through said station, and spacing adjacent ejection stations in the order of half the distance between subsequent carrying members.

2. The method of claim 1 further comprising mounting a fixed discharge rail near only one side of each station, and catching a suspension member with its product on said rail.

3. The method of claim 2 further comprising providing a garment hanger with a hook open on one side as said suspension member.

4. An installation for sorting goods, which are each carried by a hook-shaped hanger, said installation comprising a driven continuous conveyor including a closed track on which said hangers travel in a fixed direction and along which a number of ejection stations are installed, said installation comprising a series of mutually spaced claws in which a hanger can be taken up, each hanger hanging perpendicular to the direction of travel of the conveyor, each said claw including a sidewardly extending operating lever for cooperative engagement with a tiltable trigger plate at each ejection station for opening said claw, said operating levers of successive claws being directed alternately to the left and to the right side of the track, each ejection station including two trigger plates located opposite to one another, and means for independently tilting said plates, the conveyor with the claws moving between each pair of opposite trigger plates.

* * * * *